United States Patent
Quinn (10) Patent No.: US 6,928,345 B2
(45) Date of Patent: Aug. 9, 2005

(54) VEHICLE HEALTH MANAGEMENT SYSTEM

(75) Inventor: Ronald J. Quinn, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 54 days.

(21) Appl. No.: 10/383,719

(22) Filed: Mar. 6, 2003

(65) Prior Publication Data
US 2004/0176885 A1 Sep. 9, 2004

(51) Int. Cl.[7] .............................................. G06F 7/00
(52) U.S. Cl. ........................................ 701/29; 701/33
(58) Field of Search ............................ 701/1, 2, 29, 30, 701/31, 33, 34, 35; 73/116, 117.3

(56) References Cited

U.S. PATENT DOCUMENTS

| | | | |
|---|---|---|---|
| 5,671,141 A | | 9/1997 | Smith et al. |
| 6,192,302 B1 | * | 2/2001 | Giles et al. .................. 701/29 |
| 6,236,917 B1 | | 5/2001 | Liebl et al. |
| 6,350,239 B1 | | 2/2002 | Ohad et al. |
| 6,646,397 B1 | * | 11/2003 | Discenzo .................. 318/439 |
| 6,662,089 B2 | * | 12/2003 | Felke et al. .................. 701/29 |
| 6,694,235 B2 | * | 2/2004 | Akiyama ..................... 701/33 |
| 6,714,846 B2 | * | 3/2004 | Trsar et al. ................... 701/33 |
| 6,738,696 B2 | * | 5/2004 | Oi .............................. 701/29 |
| 6,748,304 B2 | * | 6/2004 | Felke et al. .................. 701/29 |

* cited by examiner

Primary Examiner—Richard M. Camby (57) ABSTRACT

A system and method for vehicle health management is provided that gives improved flexibility and performance. The vehicle health management system and method utilizes a modular approach that divides the VHM system into logical sub-elements separated by defined interfaces. The modular approach allows new features and functionality to be more easily added to the VHM, improving the flexibility and performance of the system. The vehicle health management system includes a data service, a symptom detection service and a diagnostic service. The data service receives system data from a plurality of sources and formats the data and then delivers the formatted data to the symptom detection service. The symptom detection service analyzes the formatted data for symptoms of system failure. Those portions of data that are indicative of system failure are then passed to the diagnostic service. The diagnostic service examines those portions of data to determine any potential diagnoses. Those diagnoses can then be passed on to the operator or other consumers for evaluation.

41 Claims, 12 Drawing Sheets

VEHICLE HEALTH MANAGEMENT SYSTEM

FIELD OF THE INVENTION

This invention generally relates to diagnostic systems, and more specifically relates to vehicle health management systems.

BACKGROUND OF THE INVENTION

Modern vehicles are increasingly complex and therefore require highly capable command and control systems. In the face of operational anomalies, brought on by equipment or operational failures, these vehicles require additional capabilities to identify and mitigate against the effects of failures. Vehicle Health Management (VHM) systems complement the command and control systems by helping to address failures and anomalies so that the command and control systems can operate effectively in nominal (healthy) conditions. The VHM system manages the health of the vehicle system, identifying failure states and helping mitigate the effects of these failures so that the vehicle may be returned to its nominal state. In this discussion we are focused primarily with the first aspect of health management, diagnosis, the detection of failures and isolation of the root cause of the failure One issue with vehicle health management systems is difficulty in updating functionality of the system. Previous VHM systems have been integrated together in ways that inhibit the ability to modify or update the system. For example, the systems are typically constructed such that it is difficult to add to new sources of data for testing and analysis. Typically, in order to add new functionality of new sources of data, the operation of the entire VHM system must be reevaluated. This makes upgrades to functionality problematic and limits the flexibility of the VHM system. Traditional VHM designs also suffer from their lack of "portability" across platforms, such as ground flight or lab/vehicle platform transitions. Often these systems must be redesigned in order to accomplish this type of transition.

Thus, what is needed is an improved system and for monitoring the health of vehicle systems that provides for improved flexibility and performance.

BRIEF SUMMARY OF THE INVENTION

The present invention provides a vehicle health management system and method that provides improved flexibility and performance. The vehicle health management system and method utilizes a modular approach that divides the VHM system into logical sub-elements separated by defined interfaces. The modular approach allows new features and functionality to be more easily added to the VHM, improving the flexibility and performance of the system.

The vehicle health management system includes a data service, a symptom detection service and a diagnostic service. The data service receives system data from a plurality of sources and formats the data and then delivers the formatted data to the symptom detection service. The symptom detection service analyzes the formatted data for symptoms of system failure. Those portions of data that are indicative of system failure are then passed to the diagnostic service. The diagnostic service examines those portions of data to determine any potential diagnoses. Those diagnoses can then be passed on to the operator or other consumers for evaluation.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a modular vehicle health management system and method that provides improved flexibility and performance. The modular vehicle health management system and method utilizes a modular approach that divides the VHM system into logical sub-elements separated by defined interfaces. The modular approach allows new features and functionality to be more easily added to the VHM, improving flexibility and performance of the system. The vehicle health management system includes a data service, a symptom detection service and a diagnostic service. The data service receives system data from a plurality of sources and formats the data and then delivers the formatted data to the symptom detection service. The symptom detection service analyzes the formatted data for symptoms of system failure. Those portions of data that are indicative of system failure are then passed to the diagnostic service. The diagnostic service examines those portions of data to determine any potential diagnoses. Those diagnoses can then be passed on to operators or other consumers for evaluation.

In order to facilitate improved flexibility and performance of the vehicle health management system, the data service, symptom detection service and diagnostic service are implemented with defined interfaces. Communication and data transmission to the data service, symptom detection service and diagnostic service is done through their respective interfaces. This modular design of a vehicle health management system allows new features and functionality to be more easily added to the VHM, improving flexibility and performance of the system. It also allows the VHM system to be more easily adapted to a wide range of systems, including test bed and operational systems.

The modular VHM can be adapted to monitor the health of many different types of vehicles. These vehicles include aircraft, space vehicles such as the space shuttle and space station, automobiles and such.

Figure 1:
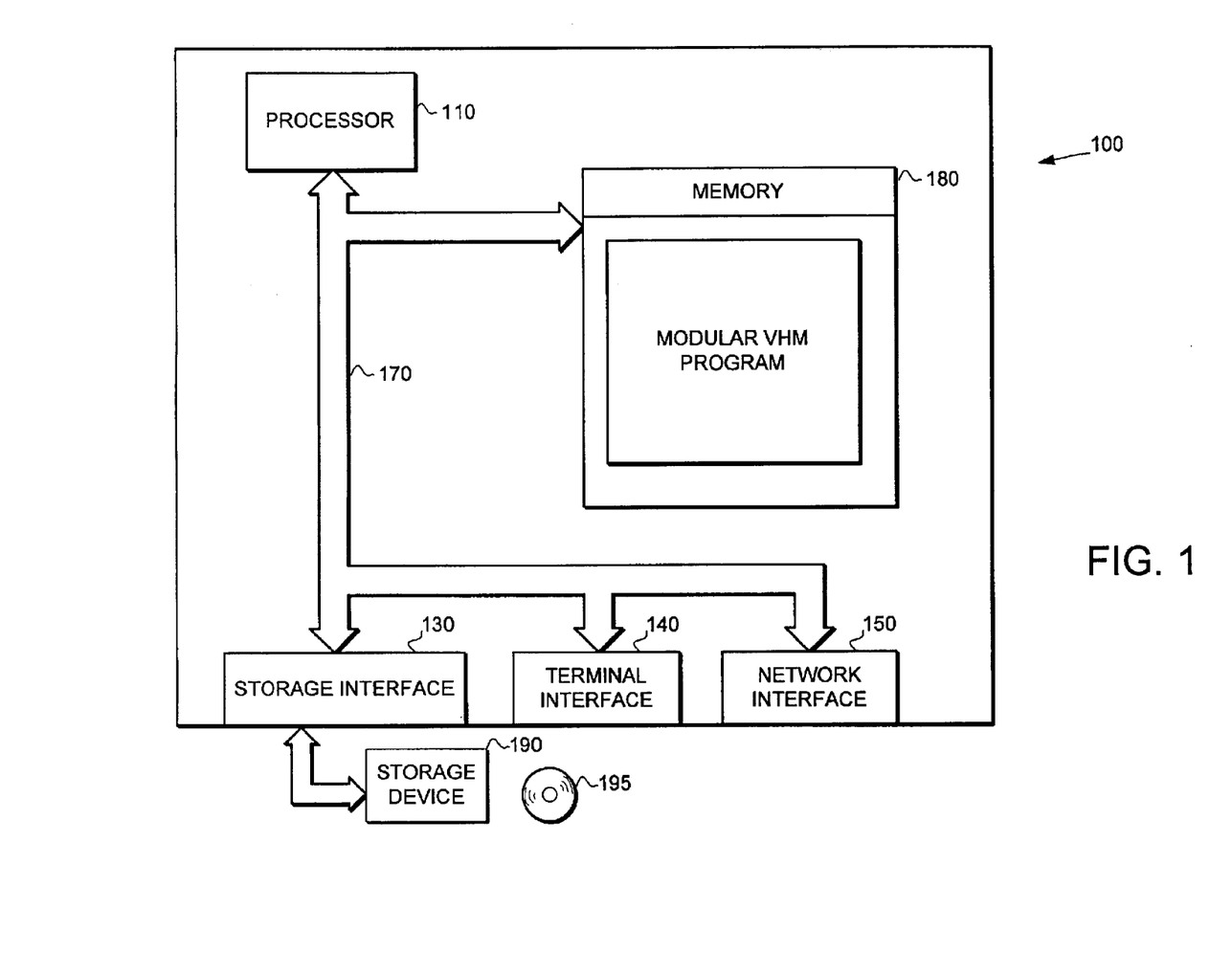
FIG. 1 is a schematic view of a computer system with a modular VHM.

Turning now to FIG. 1, an exemplary computer system 100 is illustrated. Computer system 100 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard the vehicle to provide onboard diagnostics, or on the ground to provide remote diagnostics. The exemplary computer system 100 includes a processor 110, a storage interface 130, a terminal interface 140, a network interface 150, a storage device 190, a bus 170 and a memory 180. In accordance with the preferred embodiments of the invention, the memory system 100 includes a modular vehicle health management program.

The processor 110 performs the computation and control functions of the system 100. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate computer systems, such as a system arrangement where modular vehicle health management system resides partially on a vehicle system computer that includes a processor, and partially resides on a ground control computer, that includes another processor. During operation, the processor 110 executes the programs contained within memory 180 and as, controls the general operation of the computer system 100.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 100. For example, a portion of memory 180 may reside on the vehicle system computer, and another portion may reside on the ground control computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The terminal interface 140 allows users to communicate with system 100, and can be implemented using any suitable method and apparatus. The network interface 150 allows the computer system 100 to communicate with other systems, and can be implemented using any suitable method and apparatus. The storage interface 130 represents any method of interfacing a storage apparatus to a computer system. Storage device 190 can be any suitable type of storage apparatus, including direct access storage devices such as hard disk drives, floppy disk drives and optical disk drives. As shown in FIG. 1, storage device 190 can comprise a CD type device that uses optical discs 195 to store data.

In accordance with the preferred embodiments of the invention, the computer system 100 includes the modular vehicle health management program. Specifically during operation, the vehicle health management program is stored in memory 180 and executed by processor 110. When being executed by the processor 110, the vehicle health management program manages the health of the vehicle system, identifying failure states and helping mitigate the effects of these failures so that the vehicle may be returned to its nominal state.

It should be understood that while the present invention is described in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

Figure 2:
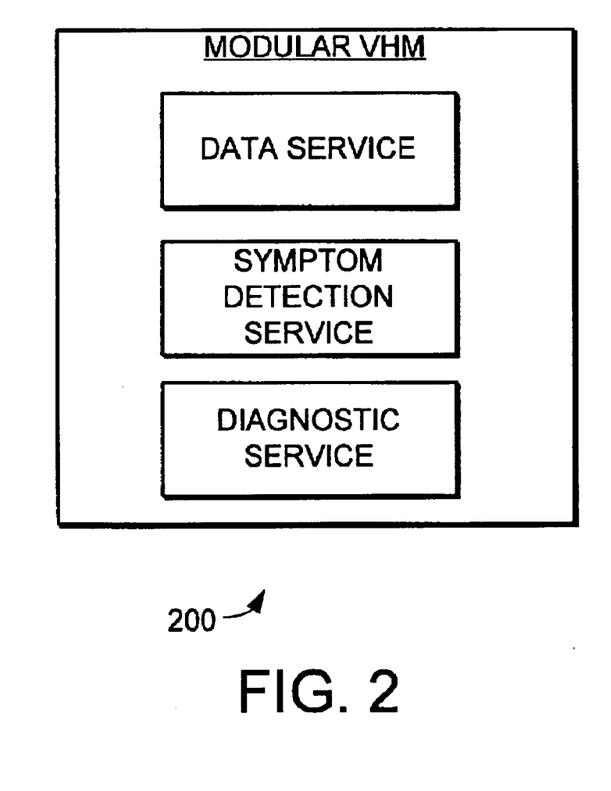
FIG. 2 is a block diagram view of a modular VHM.

Turning now to FIG. 2, the details of a modular VHM 200 are illustrated schematically. The modular VHM 200 includes a data service, a symptom detection service and a diagnostic service. The data service receives system data from a plurality of sources and formats the data and then delivers the formatted data to the symptom detection service. The symptom detection service analyzes the formatted data for symptoms of system failure. Those portions of data that are indicative of system failure are then passed to the diagnostic service. The diagnostic service examines those portions of data to determine any potential diagnoses. Those diagnoses can then be passed on to the users of the system for evaluation. Together, the data service, symptom detection service and diagnostic service all make up a VHM system that can manage the health of the vehicle system, identify failure states and help mitigate the effects of these failures.

In order to facilitate improved flexibility and performance of the vehicle health management system, the data service, symptom detection service and diagnostic service are implemented with defined interfaces. Communication and data transmission to the data service, symptom detection service and diagnostic service is done through their respective interfaces. Because the data service, symptom detection service, and diagnostic service do not have access to the internal implementations of the other sub-elements in the vehicle health management system, the internal implementation of the data service, symptom detection service, and diagnostic service can be changed without affecting the interactions with other elements. This modular design of a vehicle health management system modular approach allows new features and functionality to be more easily added to the VHM, improving flexibility and performance of the system. It also allows the VHM system to be more easily adapted to a wide range of systems, including test bed and operational systems.

Figure 3:
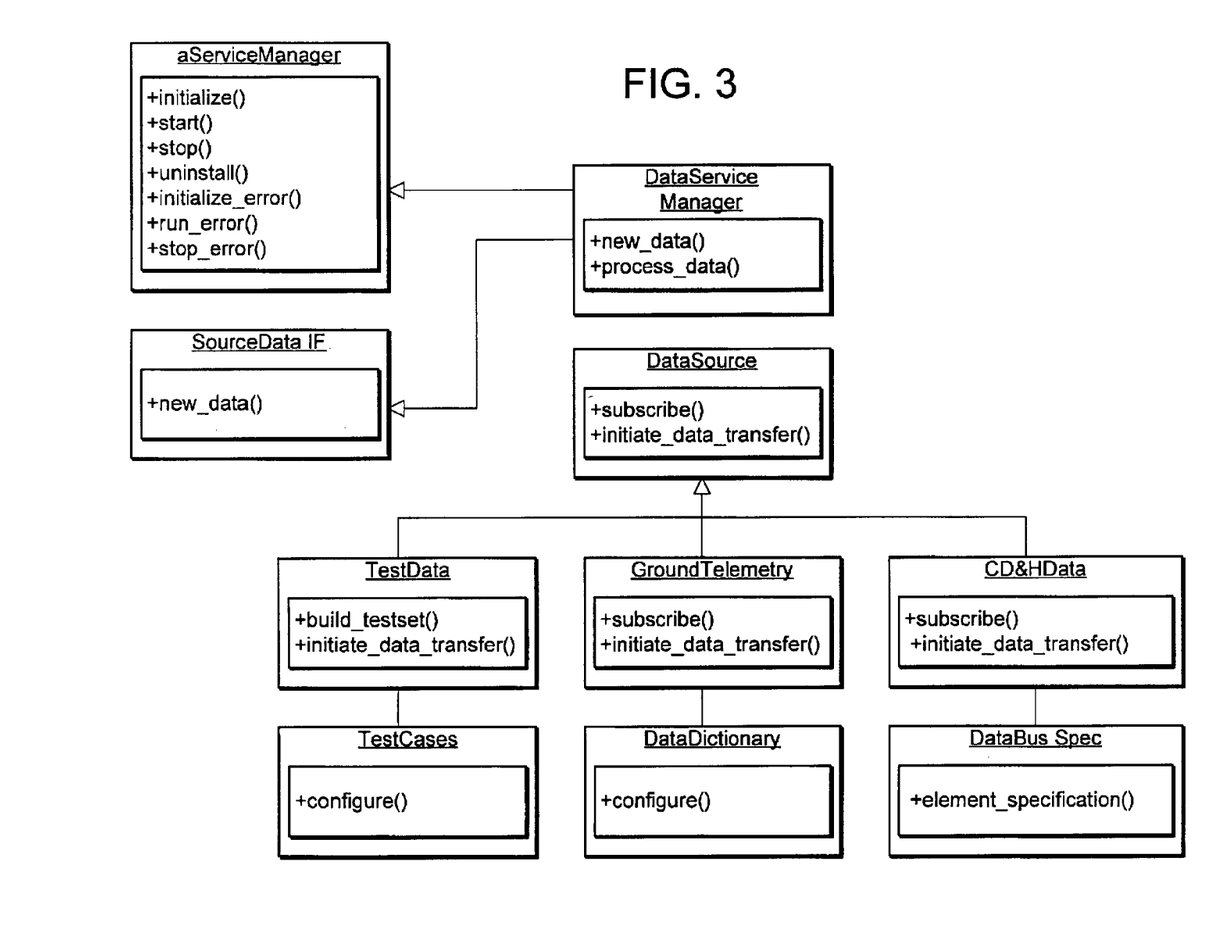
FIG. 3 is a class diagram of a data service implementation.
Figure 4:
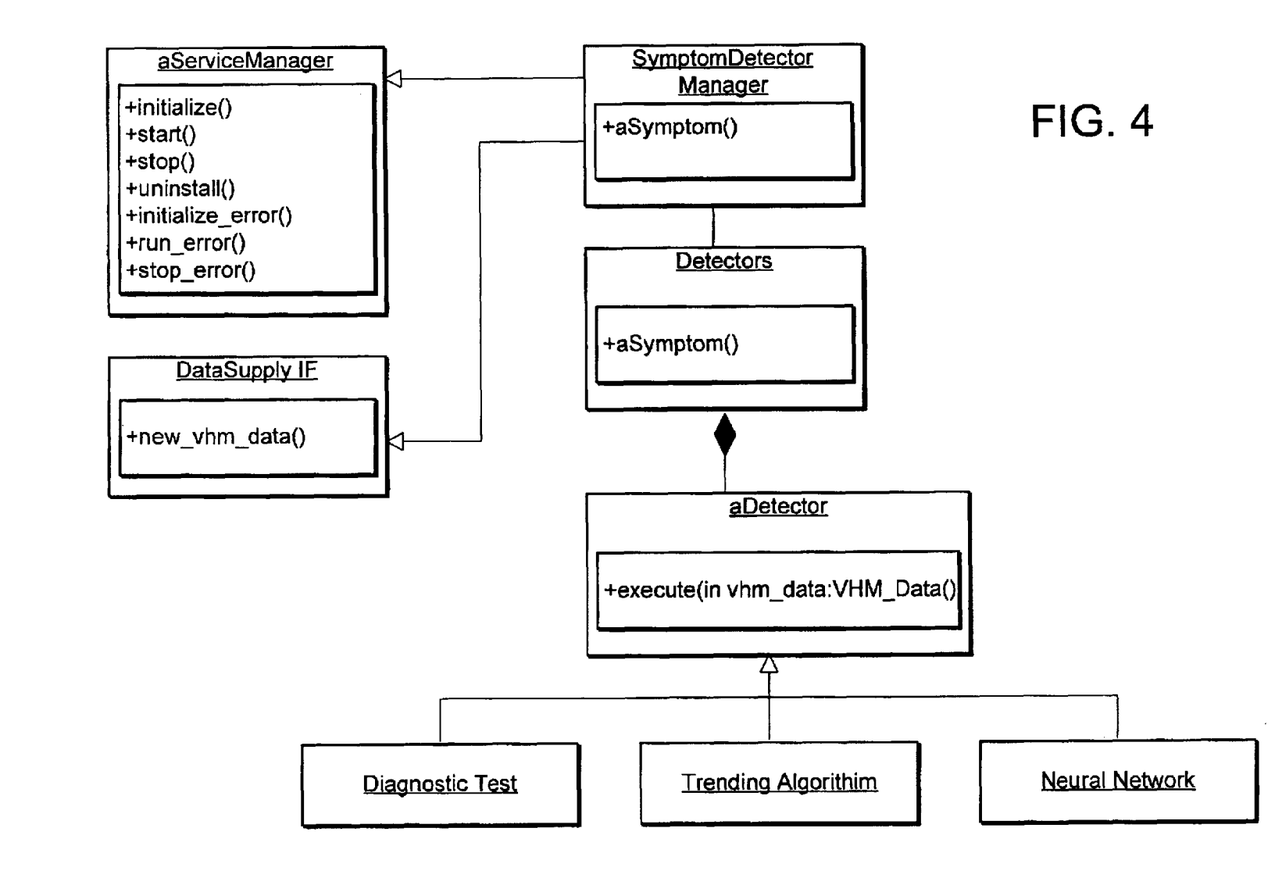
FIG. 4 is a class diagram of a symptom detection service implementation.
Figure 5:
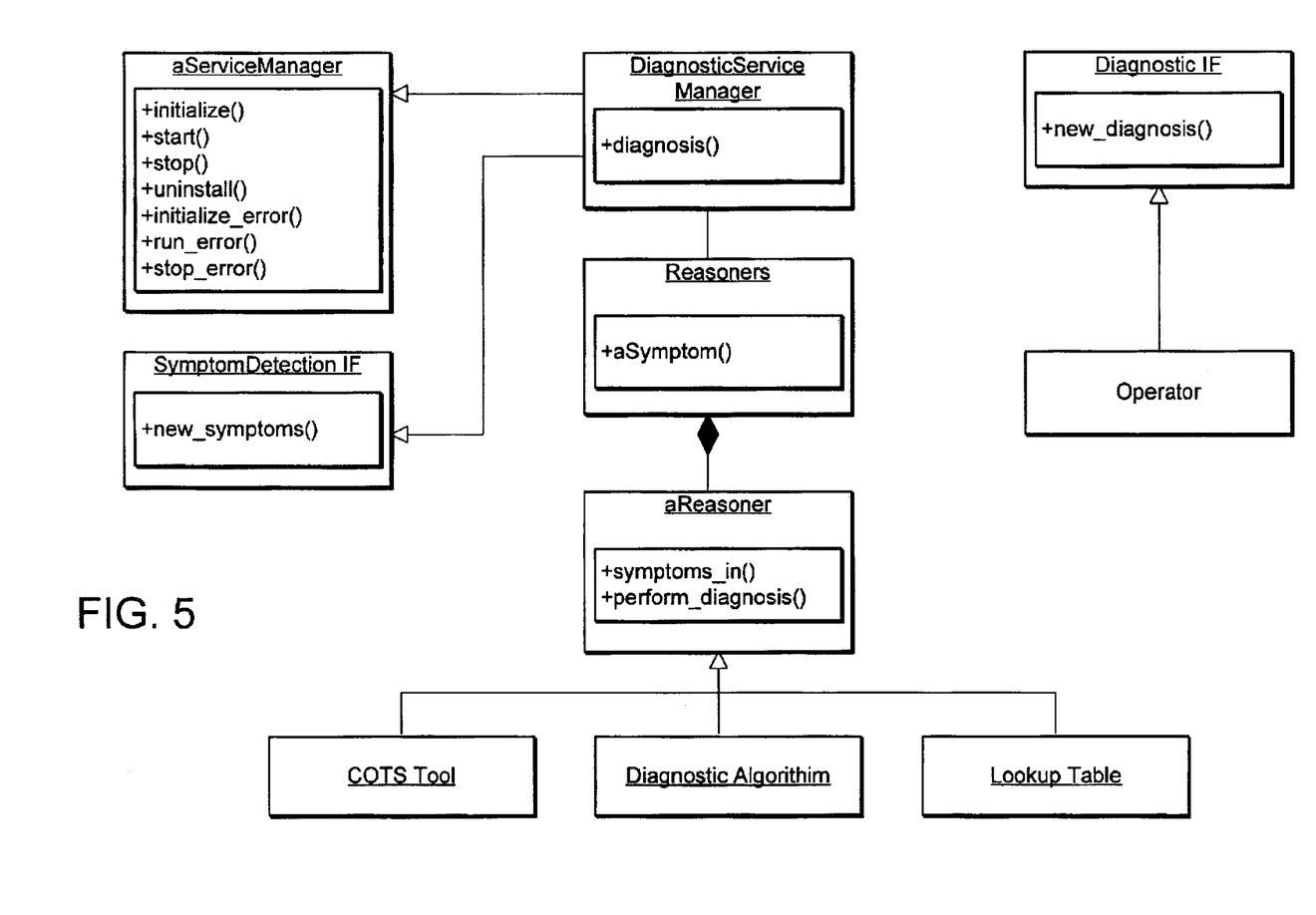
FIG. 5 is a class diagram of a diagnostic service implementation.

Turning now to FIGS. 3, 4 and 5, class diagrams illustrating one implementation of a data service, symptom detection service and diagnostic service are illustrated. These implementations are done using object oriented programming technology. In general, object oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs.

The focus of object-oriented design is on casting the problem as set of autonomous entities that can work together to provide a solution. The autonomous entities of object-oriented programming are, of course, objects. Object oriented programming is significantly different from procedural technology because problems are broken down into sets of cooperating objects instead of into hierarchies of nested computer programs or procedures.

Thus, an object-oriented program is made of code entities called objects. Each object is identifiable, encapsulated piece of code and data that provides one ore more services when requested by a client. Conceptually, an object has two parts, an external object interface, and an internal object implementation. All object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have not access to internal implementation, the internal implementation can be changed without affecting other aspects of the program.

Thus, object oriented programming isolates the requester of services from the providers of services by a well defined encapsulating interface. In the classic object mode, a client object sends request messages to server objects to perform any desired function. The message identifies a specific method to be performed by the server object, and also supplies any required parameters. The server object receives and interprets the message, and then decides what service to perform.

Another central concept in object-oriented programming is "class". A class is a template or prototype that defines a type of object. A class outlines the makeup of objects that belong to that class. For example, the class can define methods that are available on each object in the class, and data structures that are encapsulated within the objects in the class. By defining a class, objects can be created that belong to the class without having to rewrite the entire definition for each new object as it is created. This feature of object-oriented programming promotes the reusability of existing definitions and promotes the efficient use of program code.

Turning now to FIG. 3, a class diagram 300 illustrating a data service implementation is illustrated. It should be noted that this implementation is just one of many different systems that can be used to implement a data service. In this implementation, the data service comprises a DataService Manager class and a DataSource class. The DataService manager provides the functionality of the data service, receiving and formatting vehicle data. The DataSource provides an interface with the various sources of data that are delivered to the data service for processing by the VHM.

The DataService Manager inherits from a service manager class that provides the generic manager functionality. This generic manager functionality includes methods to initialize, start, stop and uninstall the DataService Manager. When called, these methods move the DataService Manager to the state specified by the call and thus these methods control the basic operation of the DataService Manager. Additionally, the service manager class includes an initialize-error, run_error and stop_error methods to provide error handling for the DataService Manger.

The DataSource class provides an interface to the various sources of data that will be processed by the VHM. In the illustrated example, the DataSource class is used to provide an abstraction for various sources of data, with three examples illustrated here. The first example of a type of data source is a data test file that can be used to test the operation of the VHM. The second example of a data source is aground telemetry system designed to receive data from a vehicle and allow VHM services to be performed on the ground. Third example of a data source is a CD&H system designed to interface directly with the on-board systems. Thus, the CD&H system is a data source that can be used for onboard VHM services.

To accomplish this, the DataSource is inherited by specific sub-classes that can be instantiated for each different source of data. In the illustrated example, the DataSource class is inherited by a TestData class used to interface with the test files that provide data used to test the operation of the VHM. Likewise, the DataSource class is inherited by a GroundTelemetry class that is used to interface with the telemetry system that communicates with the vehicle and provides data to the VHM. Finally, the DataSource class is inherited by a C&DHData class that is used to interface with on-board systems of the vehicle and provide data to the VHM for on board diagnostics. Thus, the DataSource class provides the ability for the VHM to receive data from multiple different sources in multiple different formats with limited difficulty.

The TestData class includes a build_testset method used to create a test data file and an intiate_data_transfer method used to deliver the data in the test data file to DataService Manager. The TestData class interfaces with a TestCases class that is used to configure the test data file for use in the VHM. Specifically, the TestCases class includes a configure method that configures or builds the test cases. These test cases are then used to generate test data. Thus, the TestData class and TestCases class together provide the ability of the VHM to receive and act upon test file data.

Likewise, the GroundTelemetry class includes a subscribe method to subscribe the telemetry data stream and an intiate_data_transfer method used to start the transfer of data. The GroundTelemetry class interfaces with a DataDictionary class that includes a method to configure the dictionary of data elements that will be used to produce the data stream from the telemetry system to the VHM on the ground. Thus, the GroundTelemetry and DataDictionary class together provide the ability of the VHM to receive and act upon telemetry provided data from the vehicle.

Finally, the C&DHData class includes a subscribe method to subscribe to the C&DH data stream and an initiate_data_ transfer method used to start the transfer of data. TheD&DHData class interfaces with a DataBus Spec class includes a method to specify what data elements in the on-board system are provided to the VHM system through the DataSource abstraction. Thus, the CD&HData and DataBus Spec class together provide the ability of the VHM to directly interface with a vehicles onboard systems to provide on-board VHM services.

Turning now to FIG. 4, a class diagram 400 illustrating a symptom detection service implementation is illustrated. It should be noted that this implementation is just one of many different systems that can be used to implement a symptom detection service. In this implementation, the symptom detection service comprises a SymptomDetector Manager class, a Detectors aggregate class and aDetector aggregate class. The SymptomDetector Manager provides the general functionality of the service, and manages and controls the operation of the individual detectors.

Like the DataService Manager, the SymptomDetector Manager inherits from a service manager class that provides the generic manager functionality. This generic manager functionality includes methods to initialize, start, stop and uninstall the SymptomDetector Manager, as well as methods that provide error handling.

The SymptomDetector Manager class also inherits from a DataSupply IF. The DataSupply IF provides an interface to the symptom detection service. In the illustrated example, the DataSupply IF class includes a new_vhm_data method that is called by the data service to provide the formatted VHM data to the symptom detection service. The data specified in the new_vhm_data method call is then examined for symptoms that are indicative of system problems by the symptom detection service.

The SymptomDetector Manager has the ability to use and control multiple detectors used to search for symptoms. To facilitate this, the SymptomDetector Manager manages a aDetector aggregate class that controls the operation one or more aDetector objects. When instantiated, each aDetector object includes an execute method for processing data that has been specified and delivered by the data service.

The aDetector abstraction can represent many different types and implementations of specific detectors, with these different types employing different detection mechanism. In the illustrated example, the aDetectors examples include a diagnostic test, a trending algorithm, and a neural network implementation. Specifically, new aDetectors of these types and others can be added to symptom detection service by instantiating the appropriate aDetector objects and adding those objects to the Detector collection. Of course, these are just three examples of the type of aDetectors that can be implemented and used to provide symptom detection. The symptom detection service thus has the ability to provide a wide range of detection types and services through a single defined interface. This improves the flexibility and robustness of the solution.

Turning now to FIG. 5, a class diagram 500 illustrating a diagnostic service implementation is illustrated. It should be noted that this implementation is just one of many different systems that can be used to implement a diagnostic service. In this implementation, the diagnostic service comprises a DiagnosticService Manager, a Reasoners aggregate class and aReasoner for each reasoner in the service. The DiagnosticReasoner Manager provides the general functionality of the service, and manages and controls the operation of the individual reasoners.

Like the DataService Manager and SymptomDetector Manager, the DiagnosticService Manager inherits from a service manager class that provides the generic manager functionality. This generic manager functionality includes methods to initialize, start, stop and uninstall the DiagnosticService Manager, as well as methods that provide error handling.

The DiagnosticService Manager class also inherits from a SymptomDetection IF. The SymptomDetection IF provides an interface to the diagnostic service. In the illustrated example, the SymptomDetection IF class includes a new_symptoms method that is called by the symptom detection service to provide the detected symptoms to the diagnostic service. The data specified in the new_symptoms method call is then examined to determine a possible diagnosis that can account for the found symptoms.

The diagnostic service also includes a Diagnostic IF class. The Diagnostic IF class provides the interface by which the diagnostic service will communicate with the operator, or any other consumer of it diagnostic services. To receive diagnosis from the diagnostic service, the operator or other consumer would inherit from the Diagnostic IF and subscribe to receive diagnosis. Thus, the diagnostic service has the ability to provide diagnosis to multiple different operators with limited difficulty.

The DiagnosticService Manager has the ability to use and control multiple reasoners to determine possible diagnosis. To facilitate this, the DiagnosticService Manager manages a Reasoners aggregate class that controls the operation of one or more instantiated aReasoners. Each instantiated aReasoners includes a symptoms_in method for passing specific symptoms and a perform_diagnosis to process the specific symptoms and search for potential a diagnosis.

Figure 6:
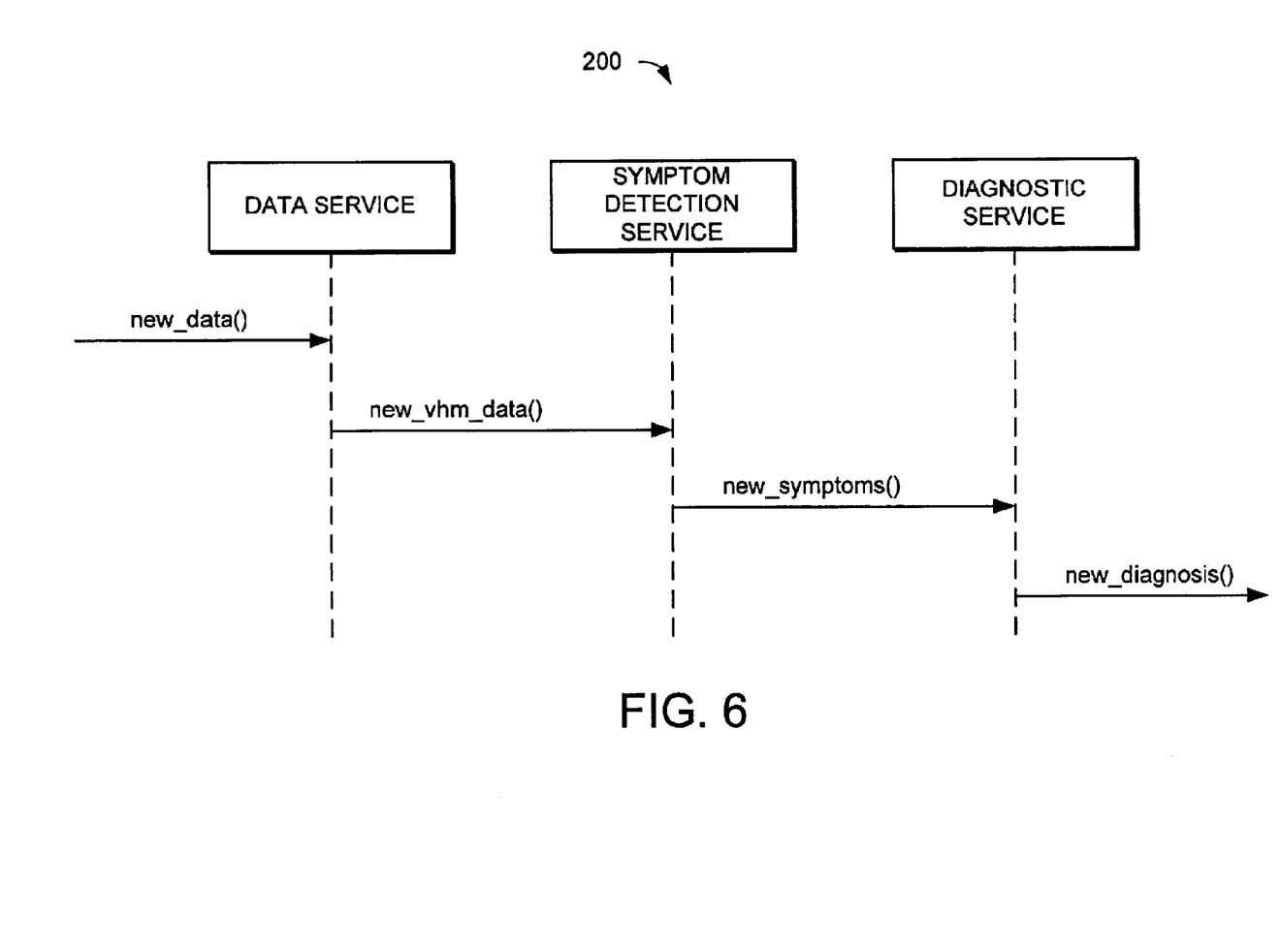
FIGS. 6–12 are process flow diagrams illustrating exemplary process flows for a modular VHM.

The aReasoners abstraction can represent many different types and implementations of specific detectors, including those having different reasoning mechanisms. In the illustrated example, the aReasoners comprise a COTS tool, a diagnostic algorithm and a lookup table. To implement these and other multiple reasoners, a aReasoner object of these types and others can be added to diagnostic service by instantiating the appropriate aReasoner objects and adding those objects to the Reasoner collection. Of course, these are just three examples of the type of aReasoners that can be implemented and used to provide symptom detection. The aReasoner class thus has the ability to provide a wide range of diagnostic tools and services through a single defined interface. This improves the flexibility and robustness of the solution Turning now to FIG. 6, a simplified flow diagram showing the main method calls that would be used in the modular VHM implementation illustrated in FIGS. 3, 4 and 5. Specifically, FIG. 6 illustrates the calls that would be made from instantiated objects used to implement the modular VHM. First, vehicle data would be provided to the data service through the new_data method. Again, this vehicle data can be provided from multiple different sources, such as data test files, ground telemetry, or on board systems such as CD&H. The data service then formats and parses the data, and sends the processed data to the symptom detection service in the form a new_vhm_data method call. There, the symptom detection service can analyze the data using any of the instantiated aDetectors. Symptoms that are found by the symptom detection service are then passed to the diagnostic service in the form of a new_symptoms method call. There, the diagnostic service can analyze the symptoms using any of the instantiated aReasoners. Any potential diagnosis can then be passed to the operator or other consumer using the new_diagnosis method.

Figure 7:
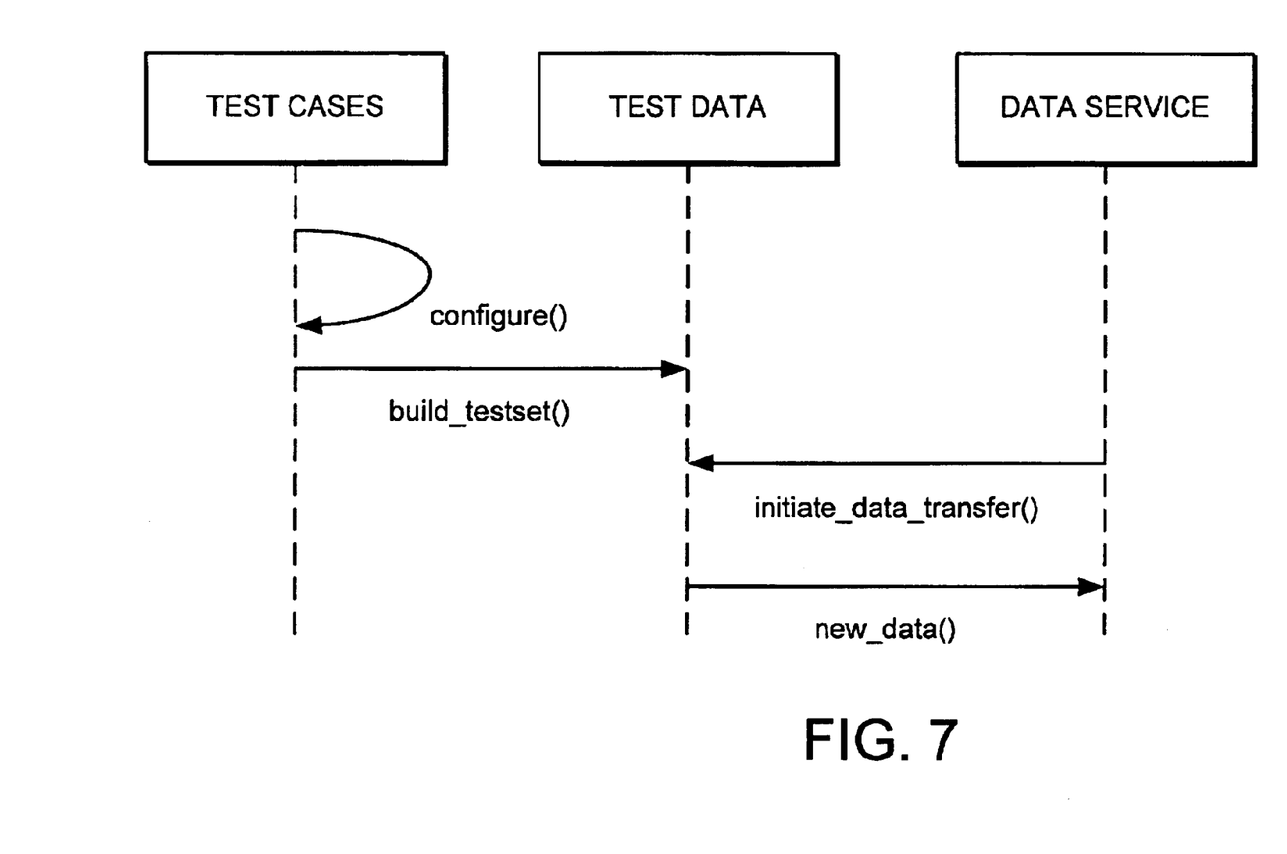
Figure 8:
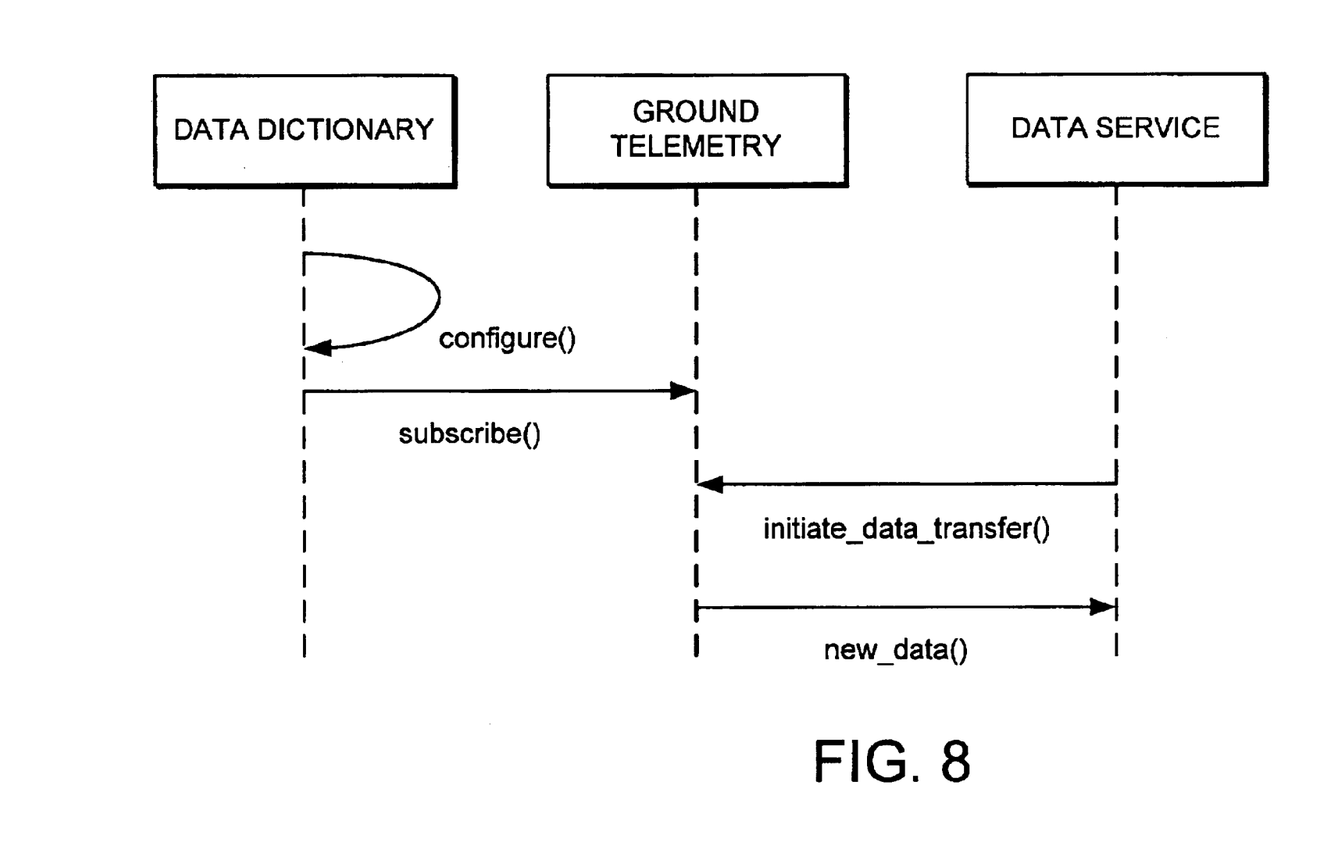
Figure 9:
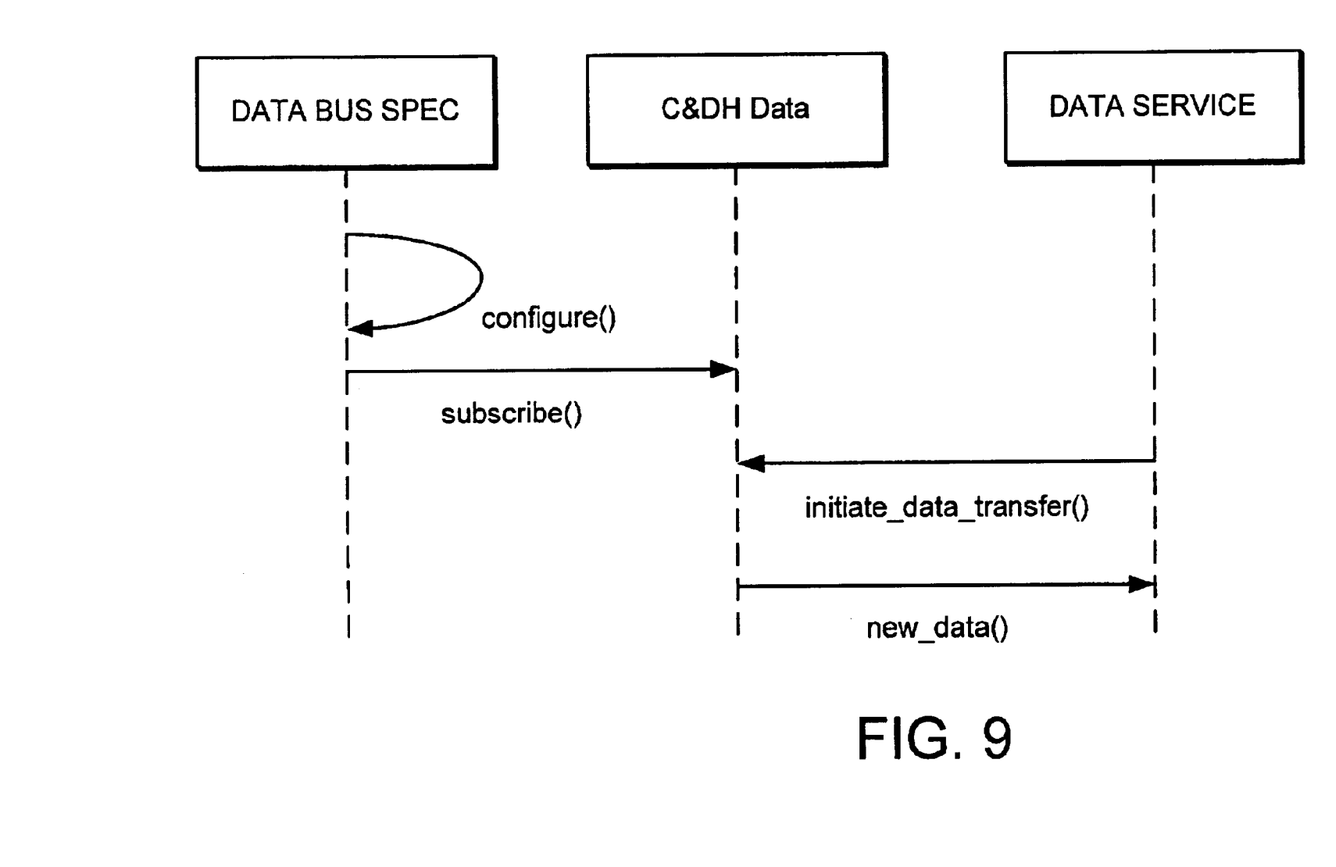
Figure 10:
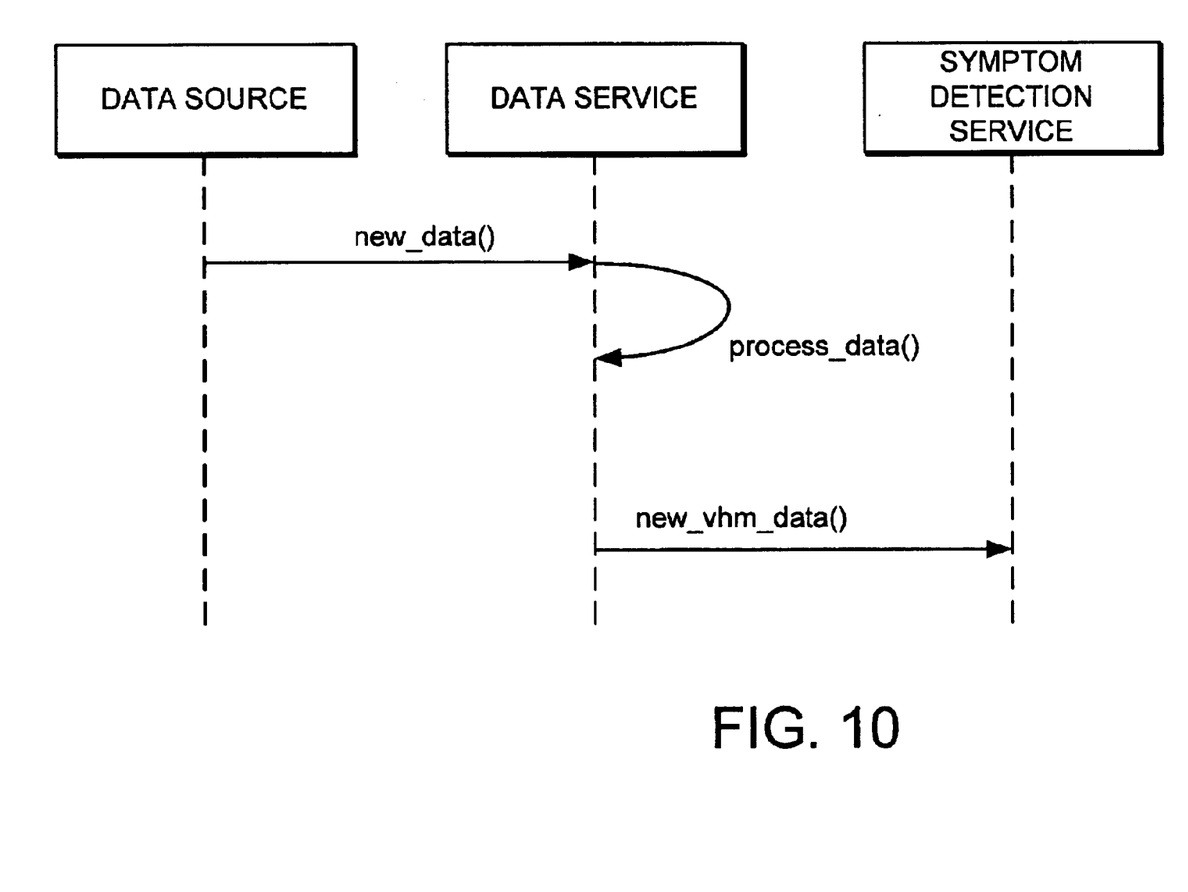
Figure 11:
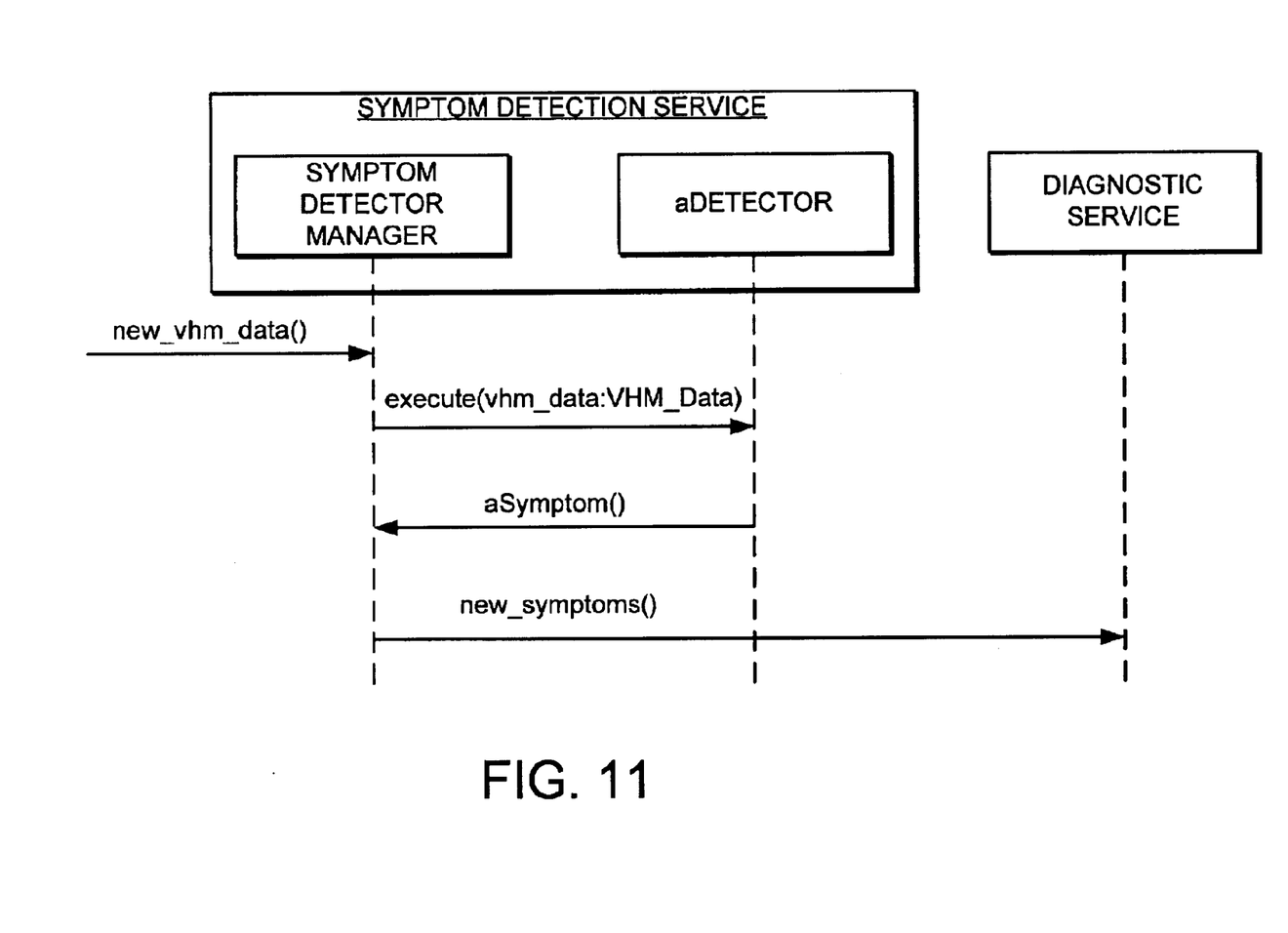
Figure 12:
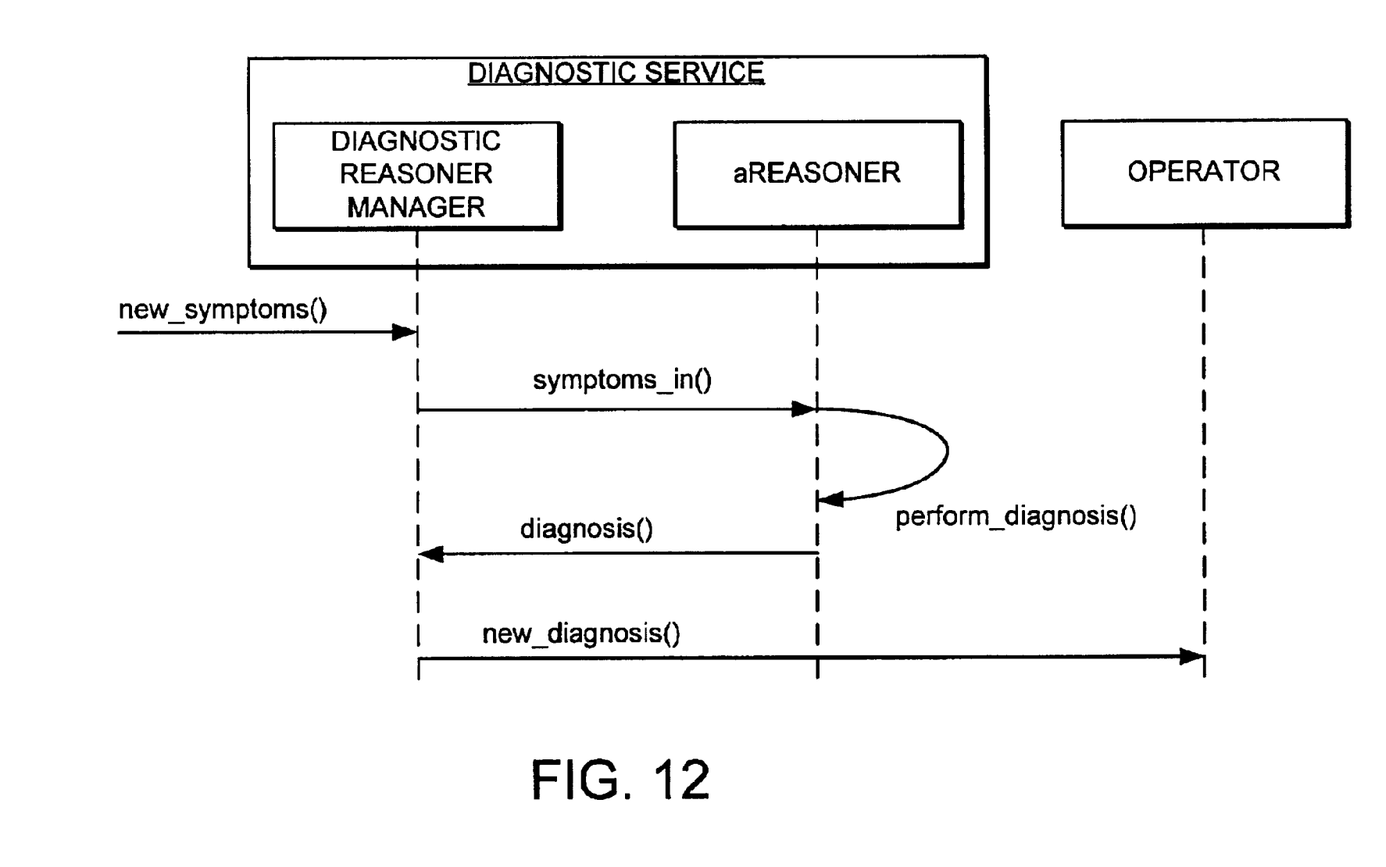

Turning now to FIGS. 7, 8, 9, 10, 11 and 12 more detailed flow diagrams are illustrated that show the operation of the VHM system and the method calls that could be made in the modular VHM implementation. FIGS. 7, 8 and 9 illustrate three examples of configuring and passing data to the data service from three different sources, namely, from a test data file, a ground telemetry system, and a C&DH Data system. These data sources represent data supply options in three typical settings: off-line, online and on-board respectively. FIGS. 10, 11 and 12 then illustrate the nominal operation of the VHM system and the remaining method calls between the data service, symptom detection service, and diagnostic service.

Turning first to FIG. 7, when data is to be provided to the data service from a test data file during on off-line setting, the test cases and test data objects are used. The first step is a configure call that causes the test cases object to synthesize the test cases used in the test scenarios. Next, the test data object receives the build_testset method that produces the raw test data that will be sent to the data service. When the data service is ready to receive the test file data, it calls the initiate_data_transfer method on the test data object. The test data object responds by calling the new_data method on the data service while passing a pointer to configured test file data. Thus, the data service object receives the test file data and can process it for symptom detection and diagnostic reasoning.

Turning now to FIG. 8, when data is to be provided to the data service from a ground telemetry system during an on-line setting, the data dictionary and ground telemetry objects are used. The first step is again a configure call that causes the data dictionary object to be configured, selecting the telemetry data elements needed for the on-line scenarios. Next, the data dictionary object calls the subscribe method to subscribe to ground telemetry data stream. This method would typically include parameters specifying the details of the subscribed data stream. When the data service is ready to receive the data from the ground telemetry, it calls the initiate_data_transfer method on the ground telemetry object. The ground telemetry object responds by calling the new_data method on the data service while passing a pointer to configured ground telemetry data. Thus, the data service object receives the ground telemetry data and can process it for symptom detection and diagnostic reasoning.

Turning now to FIG. 9, when data is to be provided to the data service from a onboard vehicle system during an on-board setting, the data bus spec and C&DH data objects are used. The first step is again a configure call that causes the data bus spec object to be configured with the D&DH data elements needed for the on-board setting. Next, the data bus spec object calls the subscribe method to subscribe to on board C&DH data stream. This method would typically include parameters specifying the details of the subscribed data stream. When the data service is ready to receive the data from the on board system, it calls the initiate_data_transfer method on the C&DH data object. The C&DH data object responds by calling the new_data method on the data service while passing a pointer to configured on board system data. Thus, the data service object receives the on board system data and can process it for symptom detection and diagnostic reasoning.

Turning now to FIG. 10, data is provided to the data service through the new_data method. As described in FIGS. 7, 8 and 9, this data can be provided from multiple different sources, such as data test files, ground telemetry, or on board systems such as CD&H. The data service then processes the data by calling the process_data method on itself. This processing would typically include filtering and preparing the data in a format convenient for the VHM application. After the data has been processed it is sent to the symptom detection service in the form the new_vhm_data method call.

Turning now to FIG. 11, the new_vhm_data method is received by the SymptomDetector Manager. The SymptomDetector Manager then calls an execute method on the aDetector(s) that are being used to detect symptoms in that data, with the execute method call specifying a particular data set that is to be analyzed by a particular aDetector (e.g., a diagnostic test, a trending algorithm, a neural network). Thus, the symptom detection service can use any combination of instantiated detectors to analyze any particular specified data set. The aDetector then returns any symptoms found to the SymptomDetector Manager in the form a aSymptom call. The located symptoms are then processed and passed to the diagnostic service using the new_symptoms method call.

Turning now to FIG. 12, the new_symptoms method call is received by the DiagnosticReasoner Manager. The DiagnosticReasoner Manager then calls a symptoms_in method on the aReasoners (s) that are being used to diagnosis the symptoms in that data. Thus, the diagnostic service can use any combination of instantiated reasoners to analyze any particular specified set of symptoms. The aReasoner performs a diagnosis on the symptoms by calling perform_diagnosis on itself. It then returns any diagnosis found to the DiagnosticReasoner Manager in the form a diagnosis call. The located diagnosis are then processed and passed to the operator using the new$_{13}$ diagnosis method call.

Again, it should be noted that the specific object oriented implementation of a modular VHM illustrated and described with reference to FIGS. 3–12 is just one example of the type of modular VHMs that can be provided using the embodiments of the invention. Common variations could include a distributed implementation with elements implemented across physical boundaries (on-board, on-ground); a hierarchical implementation with the services themselves being hierarchical implementations of component services linked together to compose the three key services (data service, symptom detection service, and diagnostic service)

The present invention thus provides a vehicle health management system and method that provides improved flexibility and performance. The vehicle health management system and method utilizes a modular approach that divides the VHM system into logical sub-elements separated by defined interfaces. The modular approach allows new features and functionality to be more easily added to the VHM, improving flexibility and performance of the system. The vehicle health management system includes a data service, a symptom detection service and a diagnostic service. The data service receives system data from a plurality of sources and formats the data and then delivers the formatted data to the symptom detection service. The symptom detection service analyzes the formatted data for symptoms of system failure. Those portions of data that are indicative of system failure are then passed to the diagnostic service. The diagnostic service examines those portions of data to determine any potential diagnoses. Those diagnoses can then be passed on to the operators or other consumers for evaluation.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. An apparatus comprising:
   a) a processor;
   b) a memory coupled to the processor;
   c) a vehicle health management program residing in the memory and being executed by the processor, the vehicle health management program including:
   i) a data service, the data service receiving system data, the data service formatting the system data for health management analysis;
   ii) a symptom detection service, the symptom detection service receiving the formatted system data and examining the formatted system data to synthesize symptoms of vehicle system failure, wherein the symptom detection service includes a collection of detector objects, each of the collection of detector objects including a method to provide symptom detection on the formatted system data; and iii) a diagnostic service, the diagnostic service examining the symptoms of vehicle system failure to determine at least one potential diagnoses from the symptoms, wherein the diagnostic service includes a collection of reasoner objects, each of the collection of reasoner objects including a method to provide diagnostic reasoning on the symptoms, and wherein the collection of reasoner objects includes at least two having a different reasoning mechanism.

2. The apparatus of claim 1 wherein the data service comprises a data source interface for receiving the system data, the data source interface receiving the system data from one of a plurality of sources.

3. The apparatus of claim 2 wherein the plurality of sources include a test data file, a ground telemetry system, and an onboard vehicle system.

4. The apparatus of claim 1 wherein the data service includes a data source object, the data source object including a subscribe method for subscribing to a data stream that includes the system data, and an initiate data transfer method for starting data transfer of the data stream to the data service.

5. The apparatus of claim 1 wherein the data service includes a data service manager, the data service manager controlling operation of the data service.

6. The apparatus of claim 1 wherein the symptom detection service includes a plurality of detectors, the plurality of detectors examining the formatted system data for symptoms of vehicle system.

7. The apparatus of claim 1 wherein the symptom detection service includes a data supply interface, the data supply interface including a method for receiving the formatted system data from the data service.

8. The apparatus of claim 1 wherein the collection of detector objects supports a plurality of detection mechanisms.

9. The apparatus of claim 8 wherein the detection mechanisms includes a diagnostic test, a trending algorithm, and a neural network.

10. The apparatus of claim 1 wherein the diagnostic service includes a diagnostic service manager to control the operation of the diagnostic service.

11. The apparatus of claim 1 wherein the diagnostic service includes a plurality of reasoners, each of the plurality of reasoners examining the symptoms of system failure to determine at least one potential diagnosis.

12. The apparatus of claim 1 wherein the diagnostic service includes a symptom detection interface, the symptom detection interface including a method for passing a reference to the symptoms to the diagnostic service.

13. The apparatus of claim 1 wherein the different reasoner mechanisms includes a COTS tool, a diagnostic algorithm and a lookup table.

14. A vehicle health management system, the vehicle health management system including:
a) a data service, the data service receiving system data, the data service formatting the system data for health management analysis;
b) a symptom detection service, the symptom detection service receiving the formatted system data and examining the formatted system data to synthesize symptoms of vehicle system failure, wherein the symptom detection service includes a collection of detector objects, each of the collection of detector objects including a method to provide symptom detection on the formatted system data; and
c) a diagnostic service, the diagnostic service examining the symptoms of vehicle system failure to determine at least one potential diagnoses from the symptoms, wherein the diagnostic service includes a collection of reasoner objects, each of the collection of reasoner objects including a method to provide diagnostic reasoning on the symptoms, and wherein the collection of reasoner objects includes at least two having a different reasoning mechanism.

15. The system of claim 14 wherein the data service comprises a data source interface for receiving the system data, the data source interface receiving the system data from one of a plurality of sources.

16. The system of claim 15 wherein the plurality of sources include a test data file, a ground telemetry system, and an onboard vehicle system.

17. The system of claim 14 wherein the data service includes a data source object, the data source object including a subscribe method for subscribing to a data stream that includes the system data, and an initiate data transfer method for starting data transfer of the data stream to the data service.

18. The system of claim 14, wherein the data service includes a data service manager, the data service manager controlling operation of the data service.

19. The system of claim 14 wherein the symptom detection service includes a plurality of detectors, the plurality of detectors examining the formatted system data for symptoms of vehicle system.

20. The system of claim 14 wherein the symptom detection service includes a data supply interface, the data supply interface including a method for receiving the formatted system data from the data service.

21. The system of claim 14 wherein the collection of detector objects supports a plurality of detection mechanisms.

22. The system of claim 21 wherein the detection mechanisms includes a diagnostic test, a trending algorithm, and a neural network.

23. The system of claim 14 wherein the diagnostic service includes a diagnostic service manager to control the operation of the diagnostic service.

24. The system of claim 14 wherein the diagnostic service includes a plurality of reasoners, each of the plurality of reasoners examining the symptoms of system failure to determine at least one potential diagnosis.

25. The system of claim 14 wherein the diagnostic service includes a symptom detection interface, the symptom detection interface including a method for passing a reference to the symptoms to the diagnostic service.

26. The system of claim 14 wherein the different reasoner mechanisms includes a COTS tool, a diagnostic algorithm and a lookup table.

27. A program product comprising:
a) a vehicle health management program, the vehicle health management program including:
i) a data service, the data service receiving system data, the data service formatting the system data for health management analysis;
ii) a symptom detection service, the symptom detection service receiving the formatted system data and examining the formatted system data to synthesize symptoms of vehicle system failure, wherein the symptom detection service includes a collection of detector objects, each of the collection of detector objects including a method to provide symptom detection on the formatted system data; and iii) a diagnostic service, the diagnostic service examining the symptoms of vehicle system failure to determine at least one potential diagnoses from the symptoms, wherein the diagnostic service includes a collection of reasoner objects, each of the collection of reasoner objects including a method to provide diagnostic reasoning on the symptoms, and wherein the collection of reasoner objects includes at least two having a different reasoning mechanism; and b) signal bearing media bearing said program.

28. The program product of claim 27 wherein the signal bearing media comprises recordable media.

29. The program product of claim 27 wherein the signal bearing media comprises transmission media.

30. The program product of claim 27 wherein the data service comprises a data source interface for receiving the system data, the data source interface receiving the system data from one of a plurality of sources.

31. The program product of claim 30 wherein the plurality of sources include a test data file a ground telemetry system, and an onboard vehicle system.

32. The program product of claim 27 wherein the data service includes a data source object, the data source object including a subscribe method for subscribing to a data stream that includes the system data, and an initiate data transfer method for starting data transfer of the data stream to the data service.

33. The program product of claim 27 wherein the data service includes a data service manager, the data service manager controlling operation of the data service.

34. The program product of claim 27 wherein the symptom detection service includes a plurality of detectors, the plurality of detectors examining the formatted system data for symptoms of vehicle system.

35. The program product of claim 27 wherein the symptom detection service includes a data supply interface, the data supply interface including a method for receiving the formatted system data from the data service.

36. The program product of claim 27 wherein the collection of detector objects supports a plurality of detection mechanisms.

37. The program product of claim 36 wherein the detection mechanisms includes a diagnostic test, a trending algorithm, and a neural network.

38. The program product of claim 27 wherein diagnostic service includes a diagnostic service manager to control the operation of the diagnostic service.

39. The program product of claim 27 wherein the diagnostic service includes a plurality of reasoners, each of the plurality of reasoners examining the symptoms of system failure to determine at least one potential diagnosis.

40. The program product of claim 27, wherein the diagnostic service includes a symptom detection interface, the symptom detection interface including a method for passing a reference to the symptoms to the diagnostic service.

41. The program product of claim 27 wherein the different reasoner mechanisms includes a COTS tool, a diagnostic algorithm and a lookup table.

* * * * *